V. LANCIA.
STEERING MECHANISM FOR AUTOMOBILES.
APPLICATION FILED MAR. 23, 1914.
1,148,239. Patented July 27, 1915.
2 SHEETS—SHEET 1.
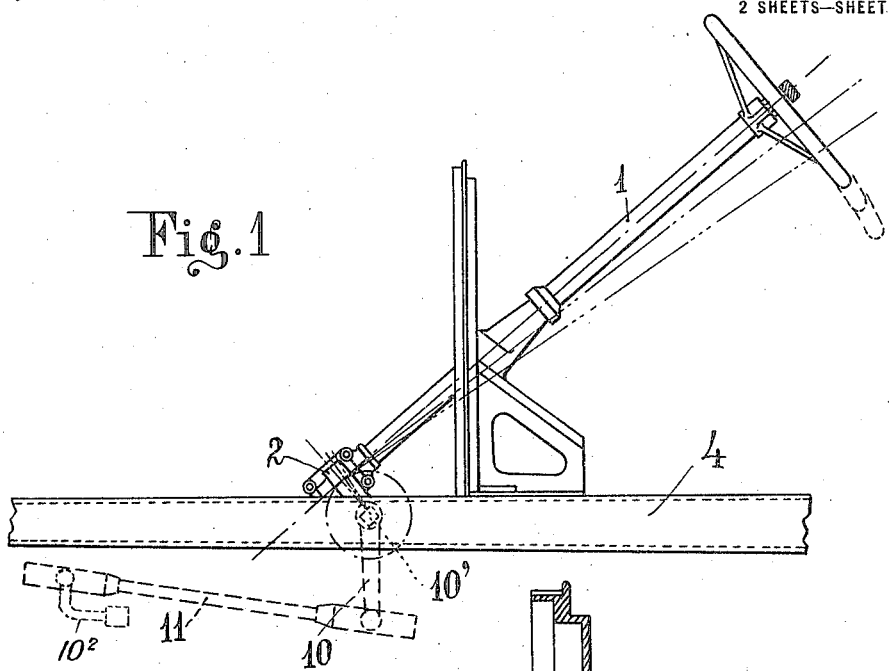
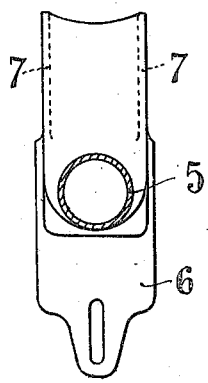
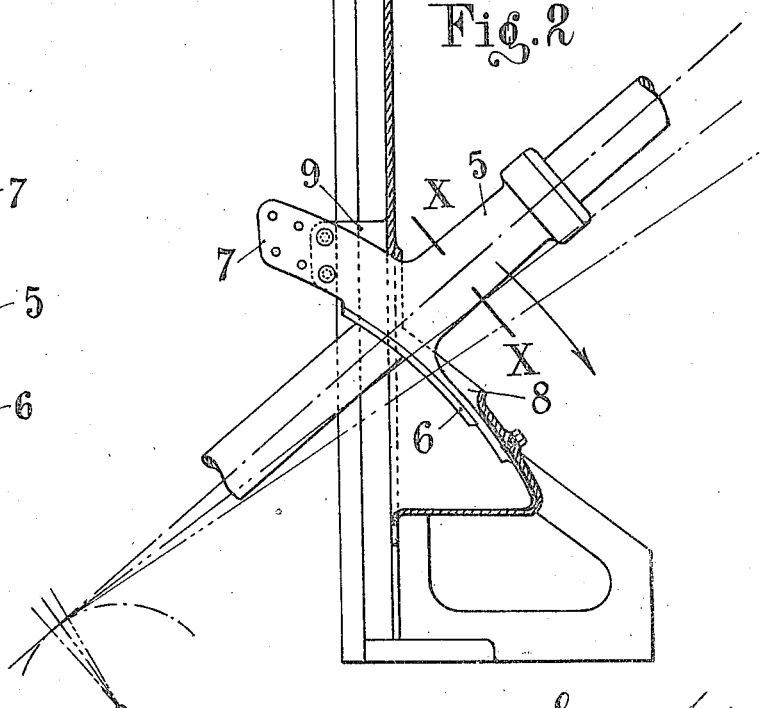
Witnesses
Inventor
Vincenzo Lancia

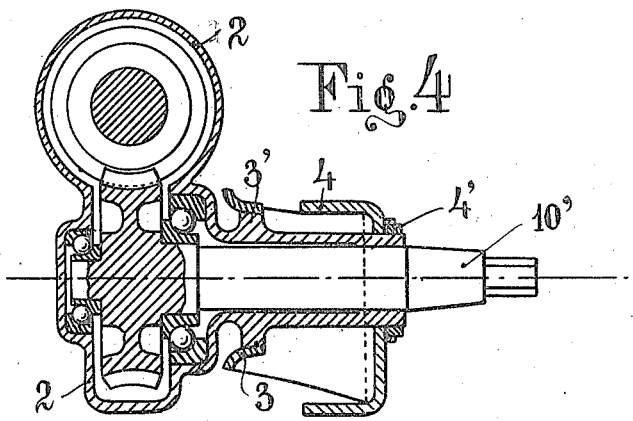
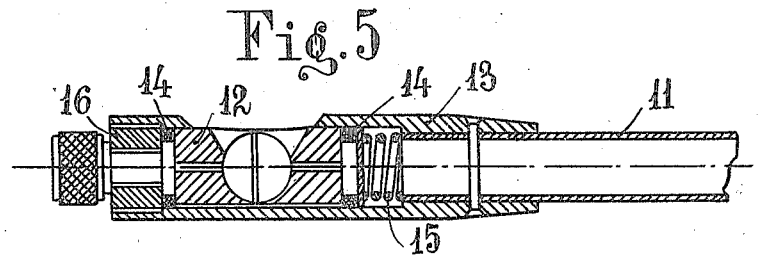
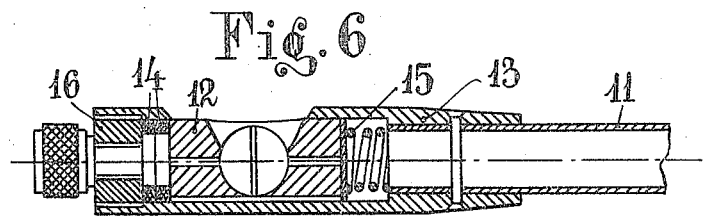
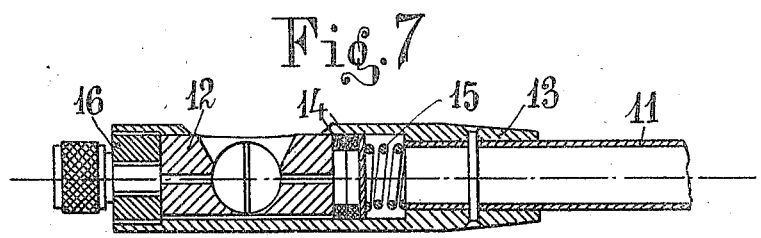

UNITED STATES PATENT OFFICE.

VINCENZO LANCIA, OF TURIN, ITALY.

STEERING MECHANISM FOR AUTOMOBILES.

1,148,239.  Specification of Letters Patent.  Patented July 27, 1915.

Application filed March 23, 1914. Serial No. 326,763.

*To all whom it may concern:*

Be it known that I, VINCENZO LANCIA, a subject of the King of Italy, residing at Turin, Italy, have invented certain new and useful Improvements in Steering Mechanism for Automobiles, of which the following is a specification.

In power-driven vehicles the desirability of being able to modify the inclination of the steering pillar or column in order to adapt the same to a particular type of body or to place it at the required distance from the seat, has been recognized, and to this end, it has been proposed to arrange the steering gear box in such a manner that it can turn about the pin of the toothed quadrant. It has also been proposed to lock the steering column in position by means of a quadrant arranged at a certain distance from the axis of rotation and to which the steering pillar may be connected.

The present invention aims at providing a stronger, simpler and more efficient device than hitherto known, for enabling the inclination of the steering column to be modified.

This invention relates to a device for modifying the inclination of the steering column in which the latter is firmly locked in position; moreover means are provided for modifying easily the length of the link connecting the steering lever to the wheels.

The accompanying drawings illustrate by way of example a construction according to the invention.

Figure 1 is a side elevation of part of a frame on which the steering column is mounted. Fig. 2 shows the mounting of the steering column. Fig. 3 is a sectional front elevation on line X—X of Fig. 2 of the sleeve carrying the column. Fig. 4 is a vertical section through the steering gear box on a larger scale to show its mounting on the frame. Figs. 5 to 7 show means to vary the length of the link connecting the steering arm to the wheels.

As will be seen in Fig. 1, the column 1 is secured in the usual manner to the casing 2 which contains the worm and the worm wheel of the usual steering gear. The casing 2 is, however, pivoted in a conical box 3 secured to the frame 4 of the car, by means of a tubular pivot pin 3' secured to the box 3, and therefore to the frame 4, by means of the nut 4'. The worm wheel is keyed in the usual manner to the pin 10' controlling the lever 10. The column 1 further carries at the level of the dashboard of the car, a sleeve 5 mounted on it and provided at the bottom with a curved lug 6, the center of curvature of which is on the axis of rotation of the casing 2, and therefore on the axis of the pin 10', and on the other hand, with two vertical walls 7. The dash-board of the car carries moreover a guide 8 through which the column passes and below which the lug 6 rests. This guide is shaped in accordance with an arc of a circle having its center at the center of rotation of the box containing the steering worm, and at the top carries two ribs 9 adjoining the ribs 7 and provided with holes. The ribs 7 could be secured to the said ribs, for instance by means of bolts. Assuming therefore that the steering column is secured in the position shown in full lines in Figs. 1 and 2, it is easy to bring it into one of the dotted positions because it is sufficient to loosen the connection between the box and the longitudinal member 4, and to release the part 5 from the fixed ribs 9, in order to render the column free to turn about the axis of the box 3 with which the guide 8 is concentrically fixed, so that the lugs 7 slide on the ribs 9, and the lug 6 slides against the lower side of the guide 8 always remaining in contact with it. It is therefore sufficient to fix the part 5 on the ribs 9 in another position, for instance by bolts and to tighten the extension 3' of the box on the longitudinal members 4, in order to fix column 1 at another inclination.

As by varying the direction of the box, the mean position of the arm 10 controlling the rod 11 which transmits the movements of the steering gear to the front wheels, is also necessarily altered, it is necessary, when the inclination of the column 1 is altered, to vary to a corresponding extent the length of the rod 11 in order to keep the front wheels in the same position parallel to the longitudinal axis of the car. To that end, assuming that it is sufficient to have three possible positions for the column 1 (and this assumes that three series of holes are provided in the rib 7), it is possible to adopt, for the connection of the rod 11 to the ends of the arms 10 and $10^2$ to which it is connected, Fig. 1, the arrangement shown separately in Figs. 5–7, that is to say, between the ends of the rod 11 and the heads of the block 12 adjustable in the sheath 13 secured to the rod 11, with which block the end of the arm to be connected engages, are inserted distance pieces for instance two washers 14 held in place by a spring 15. The same thing could be done at the other end of the rod 11 where it is connected to the lever controlling the wheels. These washers can be arranged either both at the end of the rod 11 (Fig. 7), or one at each end of the block 12 (Fig. 5) or both between the block 12 and the plug 16 which closes the outer end of the sheath 13 (Fig. 6), so that it is possible to modify very easily the length of the connection between the arm 10 and that connected direct to the front wheels. With such a construction the inclination of the steering column can be varied at will, without having to change any part, and by exceedingly simple operations.

What I claim as my invention and desire to secure by Letters Patent is:—

1. In steering mechanism for automobiles, a steering column, a casing containing the steering gear, means enabling the casing to pivot on the chassis, a sleeve mounted on the steering column, a member on the sleeve having a cylindrical surface with axis co-incident with the axis on which the casing pivots, a fixed part mounted on the dash board of the car and comprising a cylindrical surface coaxial with that on the sleeve, means for connecting the sleeve to the fixed part, and means for modifying the length of the rod connecting the steering lever to the wheel control.

2. In steering mechanism for automobiles, a steering column, a casing containing the steering gear and pivoted to the chassis, a sleeve mounted on the column, a member on the sleeve having a cylindrical surface with axis coincident with the axis on which the casing turns, an extension on the sleeve on the opposite side to the cylindrical surface, a part mounted on the dashboard of the car and comprising a cylindrical guide surface coaxial with that on the sleeve, ribs on the guide part, means for connecting the extension of the sleeve in any desired position to the ribs, and means for modifying the length of the rod connecting the steering lever to the wheel control.

3. In steering mechanism for automobiles, a steering column, a casing containing a steering worm and quadrant and pivoted to the chassis, a sleeve mounted on the column, a member on the sleeve having a cylindrical surface with axis coincident with the axis on which the casing pivots, a fixed part on the dash board of the car and comprising a cylindrical surface co-axial with that of the sleeve, a profiled guide part mounted on the dash board of the car, means for locking the sleeve of the column in the desired position on the guide part, an arm secured to the steering quadrant, a block engaging with the end of the said arm, a sheath in which the block is mounted, a rod connected at one end of the sheath and at the other end to the wheel control, washers in the sheath at one end face of the said block, and a spring in the interior of the sheath for keeping the said block in a given position.

4. In steering mechanism for automobiles, a steering column, a casing containing the steering worm and the quadrant and pivoted to the chassis, a sleeve mounted on the column, a member on the sleeve having a cylindrical surface with axis co-incident with the axis on which the casing pivots, a guide part on the dash board of the car, means for locking the sleeve of the column in any desired position on the said guide part, an arm secured to the steering quadrant, a block engaging the end of said arm, another block engaging the end of the arm controlling the wheels, a rod provided at both ends with sheaths in which the said blocks are located, washers in the sheaths against one or the other end of the blocks, and springs arranged in the sheaths for keeping the blocks in a given position.

In testimony whereof I have signed my name to this specification in the presence of two subscribing witnesses.

VINCENZO LANCIA.

Witnesses:
 CARLO TORBAY,
 MARIS TORBAY.